United States Patent Office 3,466,230
Patented Sept. 9, 1969

3,466,230
TANTALUM THIN FILM CAPACITOR PRODUCTION LEAKAGE CURRENT MINIMIZING PROCESS
Mercer D. Carithers, Atlanta, Ga., assignor to Collins Radio Company, Cedar Rapids, Iowa, a corporation of Iowa
No Drawing. Filed Mar. 2, 1965, Ser. No. 436,681
Int. Cl. C23b 9/00, 5/52; C23f 17/00
U.S. Cl. 204—38
16 Claims

ABSTRACT OF THE DISCLOSURE

A process in the formation of valve metal oxide dielectric during the buildup of thin film capacitors wherein after a period of anodization the valve metal oxide dielectric is heated to an elevated temperature of approximately 300° C. or higher, held at the elevated temperature for a period of time, then rapidly cooled, and then the anodized process is resumed for more complete formation of the desired oxide film of valve metal. With another alternate using an initial oxidizing process step at an elevated temperature it is important that the rapid cooling step still be included before resumption thereafter of continued oxidization of the valve metal in providing a desired quality thin film capacitor dielectric zone between capacitor plates.

This invention relates in general to an improved method of fabricating capacitors which utilize the tendency of certain metals (commonly referred to as the valve or film-forming metals) to form a protective high-resistance oxide film on anodic polarization to the exclusion of all other electrode processes and, in particular, to a production process that results in minimizing capacitor leakage current through a tantalum oxide dielectric layer in finished capacitors.

Production of thin film capacitors, at least to one capacitor design for printed microcircuits with predetermined capacitive capability parameters, using a capacitor dielectric layer of tantalum oxide formed by submitting a tantalum film to anodization in a liquid electrolyte at a given voltage, subsequent to which, the thin metallic film forming the other plate is deposited thereover, has produced capacitors that have been found to generally have a leakage current factor approximating $1 \times 10^{-6}$ amperes with 40 volts D.C. impressed across capacitors of a given area. Such a capacitor leakage current factor may be acceptable for some circuit capacitor component requirements, marginal in meeting other installation requirements, and absolutely unacceptable for various other installation requirements. This has lead to extensive thin film capacitor testing with a high rejection rate and/or selective usage of such thin film capacitors in various circuits. A production process providing a highly reliable product having a large quantum reduction in capacitor leakage current has proven to be very much desired.

It is, therefore, a principal object of this invention to provide a capacitor production process capable of producing thin film capacitors with tantalum oxide dielectric having extremely low product rejection and reliably providing thin film capacitors having a large quantum reduction in capacitor leakage current.

A further object is to provide such tantalum oxide dielectric thin film capacitors through use of an improved process resulting in a very high production percentage output of usable capacitors and in capacitor leakage current being reduced by a factor falling in the range of from 10 to 1000 or more below previously normally encountered capacitor leakage currents with comparable capacity thin film tantalum oxide dielectric capacitors produced by pre-existing techniques.

These objects and other beneficial results are accomplished through the use of applicant's tantalum thin film capacitor production and capacitor leakage current minimizing process. This process involves the formation of a tantalum oxide dielectric during the buildup of thin film capacitors, and after a period of anodization, to produce a dielectric layer, removal of the thin film built-up structure from the anodizing solution to an oven or furnace maintaining a heated environment with a lower temperature limit of approximately 300° C. This capacitor built-up structure is held in the elevated temperature environment for a period of time, then removed to a room temperature of, for example, 25° C., and then after cooling it is placed back in the anodizing solution, of appropriate anodizing process equipment. The anodization process is then resumed for more complete formation of the appropriate oxide in an oxide film of tantalum and making the film more uniform after which a metal film is deposited on the tantalum oxide to form the second plate or electrode of the capacitor.

Thin film capacitor build up processing, in greater detail according to applicant's process, includes supplying a layer of tantalum metal such as by vapor deposition of a tantalum film of suitable thickness as by well-known sputter or vapor deposition techniques upon a suitable substrate, or upon a surface of other metal ultimately serving as a capacitor plate. Various areas of thin film circuitry not to be exposed to the subsequent anodizing process are then masked off by any of various anodizing process masking techniques. Then the capacitor built-up structure is properly electrically connected to appropriate anodizing process equipment and placed in anodizing solution. An electrical potential of proper polarity is applied through the anodizing solution and maintained for sufficient time to provide a desired layer of tantalum oxide (and/or pentoxide to a greater or lesser extent as determined to some extent by the anodizing solution being used) by anodization. Thereafter, the capacitor built-up structure is placed in an oven or furnace having an environment of air and/or oxygen at an elevated temperature in the range of from approximately 300° C. up to the temperature of substrate softening for the particular substrate that may be employed, glass for example, for a period of time. The elevated temperature of this step, would generally fall within the range of approximately 250° C. to 500° C.

A typical example of temperatures that have been employed, in a heated environment of oxygen or air, is a temperature of approximately 350° C. with the capacitor build up being held in the 350° C. temperature environment for approximately one hour followed with, cooling to a room temperature of, for example, 25° C. At this point, it might be noted that shock cooling of the capacitor build up upon removal from the furnace has produced further beneficial product results with the shock cooling being accomplished by, for example, placement of the capacitor built-up structure upon a room temperature, or lower temperature, heat sink which may be a relatively large slab of metal having a high thermal conductivity coefficient. The capacitor built-up structure is thereafter placed back in the anodizing solution and the anodizing process resumed to provide a more complete and more uniformly oxidized tantalum oxide film. Then, after this second anodizing step is completed to a desired degree, the capacitor build up is removed from the anodizing solution and disconnected from the anodizing process equipment, and the second plate completing the capacitor build up is provided, as by vapor deposition of a thin film of metal, or by any other various thin film depositing techniques of a suitable metal to provide the finished thin film capacitor.

Thin film tantalum oxide dielectric layer equipped capacitors produced according to applicant's process have been achieving highly successful results in minimization of capacitor leakage current. This has been accomplished with first anodizing step time in the range of approximately thirty minutes to one hour. The subsequent heating step has been one of approximately one hour's duration at approximately 350° C. in air or oxygen, although heating times of as short duration as approximately ten to fifteen minutes have produced quite satisfactory product results. The second anodizing step, after the cooling or shock cooling of the capacitor build up, is of extended duration of approximately two to three hours, although second anodizing steps as short as one-half hour have given satisfactory product results. However, a higher level of desired product performance results are provided with the longer duration second anodization step.

It is of interest to note that, generally, most of the tantalum oxide film thickness development is accomplished during the first anodizing step with the relative time durations usually used between the first and second anodization steps. The heating-cooling treatment of the tantalum oxide film zone conditions this zone for the second anodizing step. This heat-cooling cycle helps in correcting defects in the oxide dielectric layer such as, microfissures that develop during and after a formation of oxide film developed by straight forward anodization techniques, vacancies, impurities, areas not oxidized to completion or to the highest possible state, and intrinsic stress among others that contribute to varying degrees of leakage current in finished thin film tantalum capacitors. Further, leakage current in finished capacitors is affected by choice of electrode material, substrate compatibility and substrate roughness and depends on oxide dielectric film thickness and density which vary with the anodic process parameters and type of anodizing solution employed. Thus, the conditioning is best described by an effective decrease in the totality of defects in the capacitor film build up that contribute to leakage current paths through oxide films of approximately equal thickness, this being manifested by a reduction in capacitor leakage current to a degree of approximately 10 to 1000 times, or greater, for capacitors fabricated according to applicant's teaching. This is in comprison to considerable variation of process variables encountered with comprative capacitors similarly fabricated without using the inventive process steps.

Thin film tantalum oxide (and/or pentoxide) dielectric layer equipped capacitors have been built according to applicant's process using eighty volts as the anodizing process voltage to give 1 picofarad per square mill of capacitor plate area with the dielectric layer approximtely 1250 angstrom units thick. Generally, with this process the duration of the first anodization step is such that most of the dielectric oxide layer thickness is built up for the anodizing electric potential used and then the thickness build up is completed during the second anodization step. It is important to note that at the temperatures employed during the heating step, dielectric thickness change is ineffectually small. Capacitors produced by similar techniques, without using applicant's process, have required a thicker dielectric oxide layer running to approximately 2800 angstrom units thick and have, therefore, required an anodizing process electric potential in the range of approximately 150 to 200 volts to obtain capacitors with comparable leakage current, with, however, a reduced capacitance per unit of area of approximtely 0.5 picofarad per square mil or less. Obviously, capacitors built by these other processes must be considerbly larger, not only in thickness, but also in plate area, to satisfy comparable circuit usage requirements.

It should be noted further that applicant's process may be adapted to and employed in the build up of thin film capacitors utilizing a metal oxide dielectric layer of any of the valve metals of the family niobium, zirconium, hafnium, tantalum, titanium, tungsten, and aluminum, and other related valve metals and various alloys of these metals. Comparable beneficial results are obtained with applicant's process treatment of such various valve metal oxide layers as the results obtained with applicant's process treatment of an oxide layer of the valve metal tantalum. Further, it should be realized that other ion source mediums may be utilized in place of standard anodizing solutions with such mediums being either liquid electrolyte or ionized gas mixtures for the forming of dielectric oxide film by anodic polarization of oxide film forming metals. The applicant's first and second oxidization steps could be accomplished by gas plasma oxidization steps or, one or the other of the two oxidization steps could be an anodizing process step utilizing an anodizing solution and the other a gas plasma oxidization step, with a heat cycle step interposed between the first and second metal oxidization steps. Should the oxidization process steps be high temperature plasma gas process oxidization steps the heat cycle step could be an interim lowering of temperature of, for example, 250° C. or more and then a return to the elevated temperature for the continued oxidization process. Should one of the two oxidization process steps be at an elevated temperature level and the other at a lower temperature level the intervening temperature change process step may be the process of changing the temperature of the metal oxide film from the temperature of the first oxidization step to the temperature environment of the second oxidization process step.

Whereas, this invention is here described with respect to various closely related process variation embodiments thereof, it should be realized that various process changes changes may be made without departing from the essential contribution to the art made by the teachings hereof.

I claim:

1. In a process for producing tantalum oxide layer dielectric equipped thin film capacitors with capacitor leakage current minimized, oxidation of a tantalum oxide layer from tantalum of a partial capacitor build up by a first anodization step; next heating of the tantalum oxide layer to a temperature level in the range of approximately 250° to 500° C., and rapid shock cooling the tantalum oxide layer to approximately 25° C. or lower; then providing more complete oxidization of the tantalum oxide layer by a second anodization step; and then addition of thin film conductive material, by any of various known thin film depositing techniques, as capacitor plate means.

2. In a process for producing tantalum oxide layer dielectric equipped thin film capacitors with capacitor leakage current minimized in the finished capacitors, process steps including, from a partially built-up capacitor having first capacitor plate means and including tantalum metal, exposure of tantalum metal to a first anodizing process step of sufficient intensity and duration to oxidize a layer of the tantalum metal; subsequent heating of the tantalum oxide layer to a temperature above approximately 300° C.; rapid cooling of the tantalum oxide layer to approximately 25° C. or lower; exposure of the tantalum oxide layer to a second anodizing process step; and then adding a second capacitor plate over an area of the tantalum oxide by a thin film depositing technique.

3. The process for producing a thin film capacitor of claim 2, wherein the second anodizing process step is of longer duration than the first anodizing process step.

4. The process for producing a thin film capacitor of claim 3, wherein the first anodizing process step is of a duration approximately from one-half to equal the duration of the heating process step.

5. The process for producing a thin film capacitor of claim 4, wherein the duration of heating process step falls in the range of from approximately ten minutes to over an hour, and the duration of the second anodizing process step is in the range of approximately one half hour to four hours.

6. The process for producing a thin film capacitor of claim 5, wherein the temperature of the heating process is approximately 350° C.

7. The process for producing a thin film capacitor of claim 2, wherein the temperature of the heating process is limited by approximately the softening temperature of a component of the partially built-up capacitor.

8. In a process for producing an oxide of valve metal layer dielectric equipped thin film capacitor with capacitor leakage current minimized, oxidation of a valve metal oxide layer from a valve metal of a partial capacitor build up by a first valve metal elevated temperature oxidation step; next changing the temperature of the valve metal oxide layer downward rapidly through approximately 250 degrees of C.; subsequently providing more complete oxidization build up of the valve metal oxide layer by a second valve metal oxidization step; and then addition of thin film conductive material, by any of various known thin film depositing techniques, as capacitor plate means.

9. The process for producing a thin film capacitor of claim 8, wherein a gas plasma oxidization process is employed.

10. The process for producing a thin film capacitor of claim 9, wherein the temperature change process step is part of a heat cycle process step where the temperature of the valve metal oxide layer is changed by at least 250° C. after the first oxidization process step and then subsequently returned to substantially the temperature of the oxide layer during the first oxidization process step.

11. The process for producing a thin film capacitor of claim 8, wherein the first oxidization step and the second oxidization step are oxidization steps employing differing oxidization techniques.

12. The process for producing a thin film capacitor of claim 11, wherein said first and said second valve metal oxidization steps are different temperature and level oxidization process steps.

13. The process for producing a thin film capacitor of claim 11, wherein one of said oxidization steps employs a liquid media and the other oxidization process step employs a gaseous plasma media.

14. In a process for producing an oxide of valve metal layer dielectric equipped thin film capacitor with capacitor leakage current minimized, oxidization of a valve metal oxide layer from a valve metal of a partial capacitor build up by a first valve metal oxidization step; next using a heat cycle step including changing the temperature of the valve metal oxide layer by approximately 300° C. with shock cooling of the valve metal oxide layer through approximately 300 degrees of C., and then returning the valve metal oxide layer to approximately the temperature level existing during the first valve metal oxidization step; then providing more complete oxidization build up of the valve metal oxide layer by a second valve metal oxidization step; and then addition of thin film conductive material, by any of various known thin film depositing techniques, as capacitor plate means.

15. The process for producing the dielectric for a thin film capacitor of claim 14, wherein said heat cycle step is undertaken in an air environment.

16. The process for producing the dielectric for a thin film capacitor of claim 14, wherein said heat cycle step is undertaken in an oxygen environment.

References Cited

UNITED STATES PATENTS

| 2,785,116 | 3/1957 | Bolton et al. | 204—37 |
| 3,293,085 | 12/1966 | Smith et al. | 148—6.3 |
| 3,282,807 | 11/1966 | Burham | 204—37 |
| 3,301,704 | 1/1967 | Zind | 117—200 |

JOHN H. MACK, Primary Examiner

W. B. VANSISE, Assistant Examiner

U.S. Cl. X.R.

29—584, 570; 117—200; 204—37, 56, 42; 317—230